(12) United States Patent
Greenbaum et al.

(10) Patent No.: US 12,001,224 B1
(45) Date of Patent: Jun. 4, 2024

(54) AUTONOMOUS VEHICLE CALIBRATION

(71) Applicant: Amazon Technologies, Inc., Seattle, WA (US)

(72) Inventors: Adam Joseph Greenbaum, Boston, MA (US); Stephen Charles Paschall, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 17/707,457

(22) Filed: Mar. 29, 2022

(51) Int. Cl.
*G05D 1/00* (2006.01)
*G07C 5/00* (2006.01)
*G07C 5/08* (2006.01)
*B65G 1/04* (2006.01)

(52) U.S. Cl.
CPC ......... *G05D 1/0297* (2013.01); *G05D 1/0246* (2013.01); *G07C 5/008* (2013.01); *G07C 5/0808* (2013.01); *B65G 1/0492* (2013.01)

(58) Field of Classification Search
CPC .... G05D 1/0297; G05D 1/0246; G07C 5/008; G07C 5/0808; B65G 1/0492
See application file for complete search history.

*Primary Examiner* — Mathew Franklin Gordon
(74) *Attorney, Agent, or Firm* — Kilpatrick Townsend & Stockton LLP

(57) ABSTRACT

An inventory management system can include a fleet of mobile drive units. The mobile drive units can detect, using a sensor, calibration data associated with a calibration fixture. The calibration of the sensors can be updated based on the calibration data. The calibration data for the fleet of mobile drive units can be used determine a correction factor. The correction factor can be applied to the fleet of mobile drive units to further update the calibration of the sensors.

20 Claims, 8 Drawing Sheets

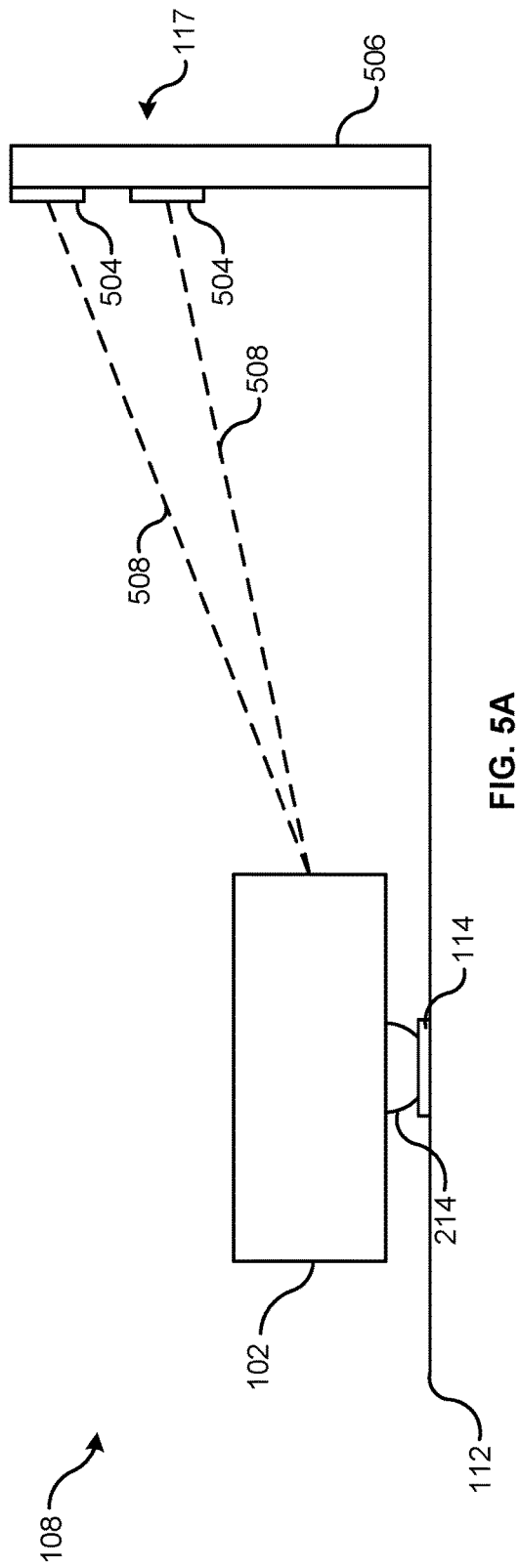
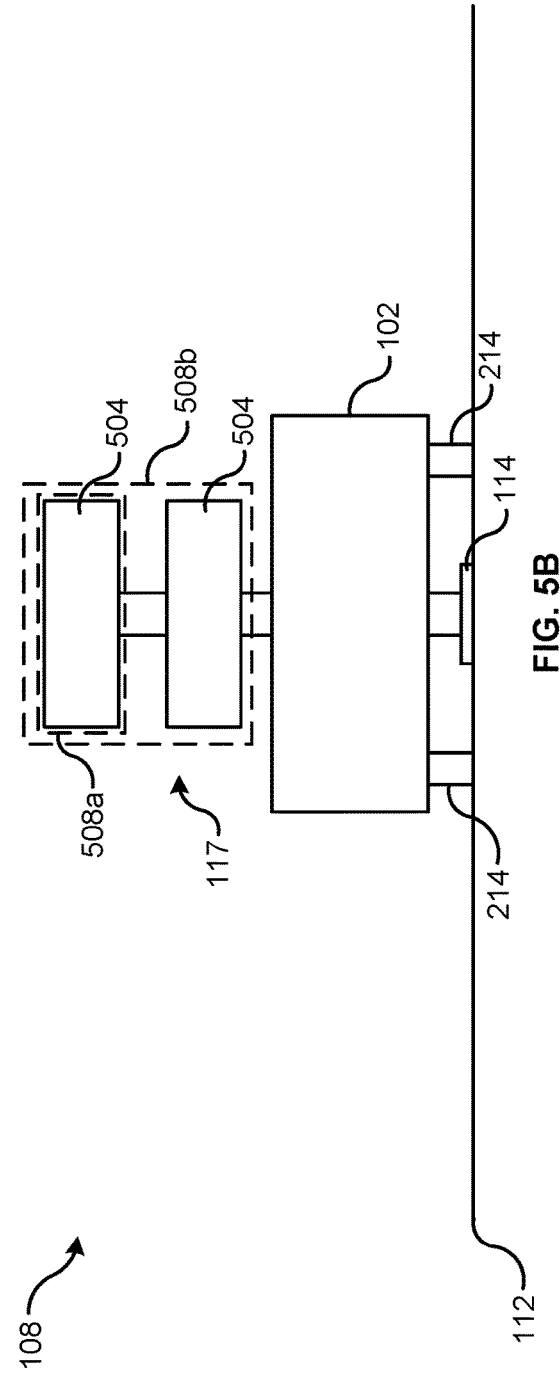

AUTONOMOUS VEHICLE CALIBRATION

BACKGROUND

Modern inventory systems, such as those in mail order warehouses, supply chain distribution centers, airport luggage systems, and custom-order manufacturing facilities, face significant challenges in responding to requests for inventory items. The inventory systems can include vehicles, for example, autonomous vehicles that can move inventory items. The autonomous vehicles can include various navigation sensors. Some of the sensors may need regular calibration. However, calibration fixtures can be expensive and can require time-consuming previous installation.

BRIEF DESCRIPTION OF THE DRAWINGS

Various embodiments in accordance with the present disclosure will be described with reference to the drawings, in which:

FIG. 5A illustrates a side view of a drive unit in the calibration region of FIG. 1, according to embodiments;

FIG. 5B illustrates a front view of the drive unit in the calibration region of FIG. 5A, according to embodiments;

DETAILED DESCRIPTION

Figure 1:
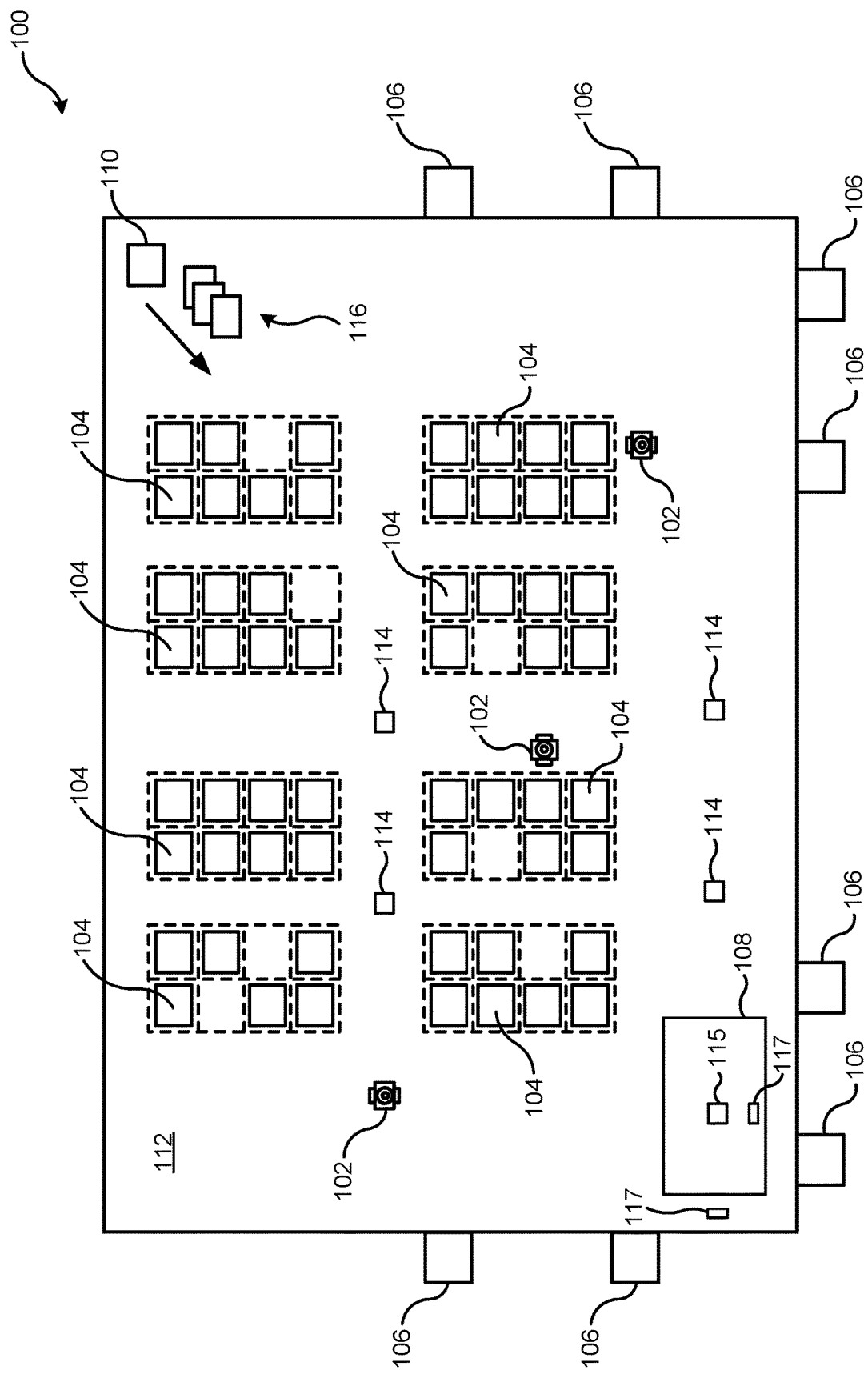
FIG. 1 illustrates a block diagram of an inventory system including a calibration region, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to inventory systems, for example, inventory systems for transporting and sorting items. In various embodiments, the inventory system can include mobile drive units (e.g., a fleet of mobile drive units) that can move inventory holders around a warehouse environment. The inventory holders can include compartments for receiving items. The mobile drive units can include various sensors. The sensors can be periodically calibrated (e.g., updated), for example, to correct for errors in the positioning of the sensors relative to the body of the mobile drive units. The sensors can detect calibration data associated with a calibration fixture. A difference between the measured calibration data and expected calibration data can be determined. The difference can be used to update the sensors to correct for the errors. The differences for the fleet of mobile drive units can also be used to determine a correction factor for the fleet.

As an illustrative example, a fleet of mobile drive units with sensors can be positioned in a warehouse environment. The warehouse environment can include a calibration region with a calibration fixture. A management module can instruct the fleet of mobile drive units to sequentially move to the calibration region for calibration of the sensors. The mobile drive units can take turns arriving at the calibration position and detecting data associated with the calibration fixture and/or the sensors. For example, the detection may involve detecting the orientation of the sensors relative to the fixture. Each of the mobile drive units can compare the detected data with expected data to determine a calibration update for the sensors mounted to the respective mobile drive units. Each of the mobile drive units can update the calibration of the respective sensors based on the calibration update (e.g., perform a local-level update). In addition, the management module can receive the difference between the detected calibration data and the expected calibration data for many or all of the mobile drive units of the fleet. Using the differences for the fleet, the management module can determine a correction factor for the fleet. The correction factor can be used to update the calibration of the sensors (e.g., perform a fleet-level or fleet-wide update).

Using the calibration fixture, the performance of the individual mobile drive unit sensors can be improved (e.g., by reducing sensor error of the individual sensors). However, the calibration fixture can have associated errors. For example, the actual position of the calibration fixture may be different from the expected position of the calibration fixture and/or the actual orientation of the calibration fixture relative to the mobile drive units may be different from the expected orientation of the calibration fixture. The errors associated with the calibration fixture can add to errors associated with the sensors. Unlike the sensor errors, the errors associated with the calibration fixture may be missed through calibration of the individual sensors and may be propagated across the fleet, e.g., leading to overall reduced accuracy of sensor operations. However, the errors associated with the calibration fixture can be corrected using the correction factor for the fleet. For example, the correction factor can be calculated for the fleet to reduce or eliminate the errors associated with the calibration fixture.

Referring now to the drawings, in which similar identifiers refer to similar elements, FIG. 1 illustrates a block diagram of an example inventory system 100, according to embodiments. The inventory system 100 can move inventory items between locations within a warehouse (e.g., workspace 112). For example, the inventory system 100 can facilitate the entry, processing, and/or removal of inventory items from the inventory system 100 and the completion of other tasks involving the inventory items. The inventory system 100 can include one or more mobile drive units 102 (e.g., a fleet of mobile drive units 102) (also referred to as autonomous vehicles, autonomous surface vehicles, autonomous robotic vehicles, mobile drive units, unmanned aerial vehicles, etc.), one or more inventory holders 104, one or more inventory stations 106, one or more calibration regions 108, and/or a management module 110. In various embodiments, the fleet of mobile drive units 102 can include more than 10, 30, 50, 100, 500, 1,000, or 10,000 mobile drive units 102. However, the fleet of mobile drive units 102 can include any suitable number of mobile drive units 102. The number of mobile drive units 102 in the fleet of mobile drive units 102 can be statistically significant. For example, a sample size of 30 mobile drive units 102 can provide a confidence interval that is high enough to determine a fleet wide correction factor based on the 30 mobile drive units 102, although any suitable number may be utilized.

The mobile drive units 102 (e.g., each drive unit) can transport the inventory holders 104, for example, between locations within a workspace 112. For example, each mobile drive unit 102 can transport one or more inventory holders 104. The mobile drive units 102 can transport the inventory holders 104 in response to commands communicated by the management module 110. The inventory holders 104 can include one or more spaces (e.g., cubbies, shelves, slots, etc.) that can receive one or more types of inventory items.

In various embodiments, the inventory holders 104 can store inventory items of the inventory system 100. For example, the inventory holders 104 can include multiple storage bins with each storage bin capable of holding one or more types of inventory items. The inventory holders 104 can be carried, rolled, and/or otherwise moved by the mobile drive units 102. The inventory items represent any objects suitable for storage, retrieval, and/or processing in the inventory system 100. For example, inventory items can be or include one or more objects of a particular type that are stored in the inventory system 100. In further embodiments, a particular inventory holder 104 can store a particular inventory item if the inventory holder 104 currently holds one or more of the same item type.

Turning to a particular example, the inventory system 100 can represent a mail-order or other order-fulfillment warehouse facility, and inventory items can represent merchandise stored in the warehouse facility. During operation, the mobile drive units 102 can retrieve the inventory holders 104 containing one or more inventory items that are requested in an order to be packed for delivery to a customer, or retrieve inventory holders 104 carrying pallets containing aggregated collections of inventory items for shipment. Moreover, in particular embodiments of the inventory system 100, boxes containing completed orders may themselves represent inventory items.

The mobile drive units 102 can be or include any suitable devices and/or components appropriate for use in the inventory system 100. For example, the mobile drive units 102 can include components based on the characteristics and configuration of the inventory holders 104 and/or other elements of the inventory system 100. In some embodiments of the inventory system 100, the mobile drive units 102 can be or include autonomous robotic vehicles that can move about the workspace 112. One or more of the mobile drive units 102 can be equipped with sensors (e.g., sensors 218), such as a stereo camera, that enables the drive unit(s) to detect obstacles (e.g., items or objects) and alert human operators to the location of the obstacles, so that the obstacles can be removed.

Figure 2:
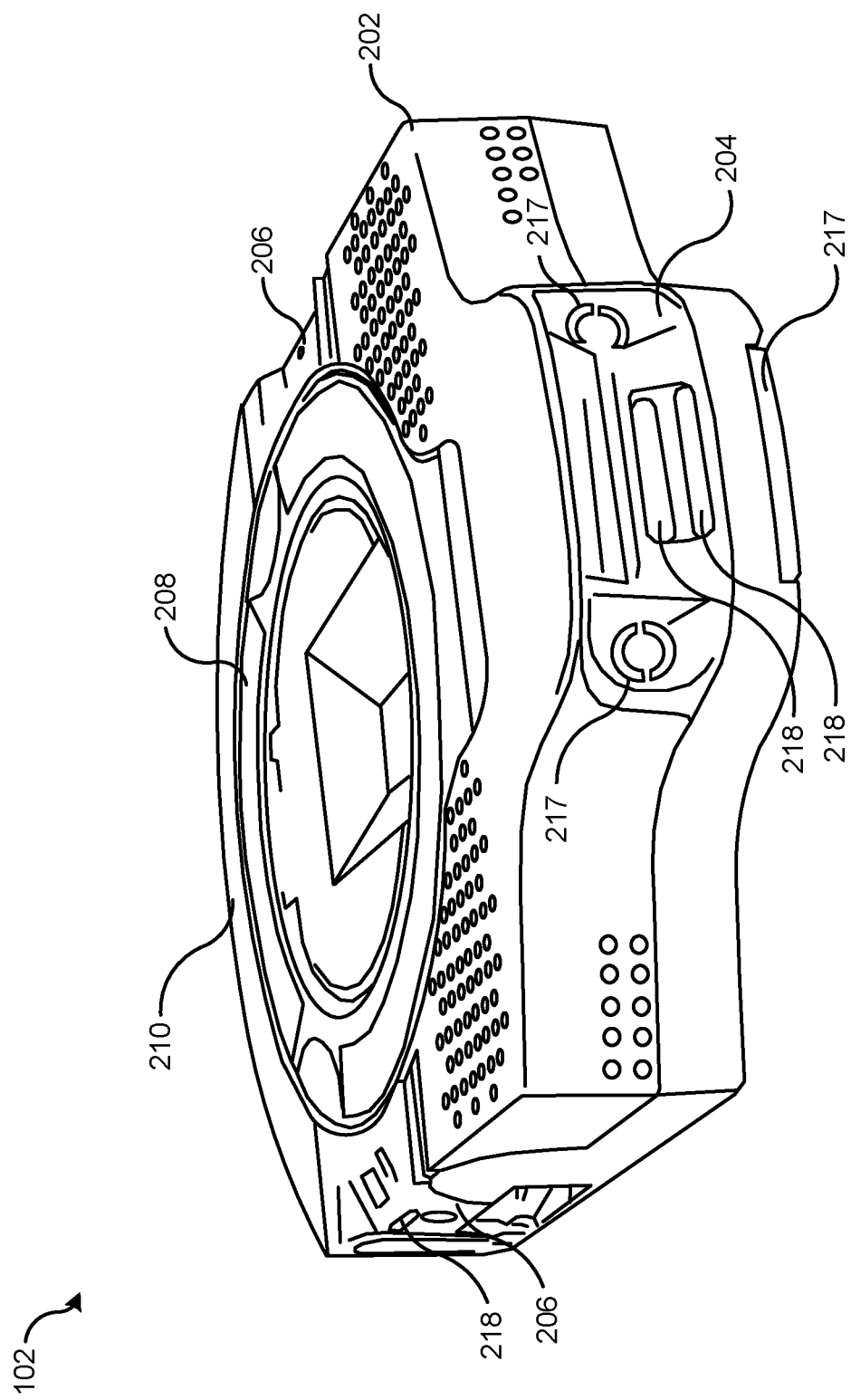
FIG. 2 illustrates a perspective view of a drive unit for use with particular embodiments of the inventory system of FIG. 1, according to embodiments.
Figure 3:
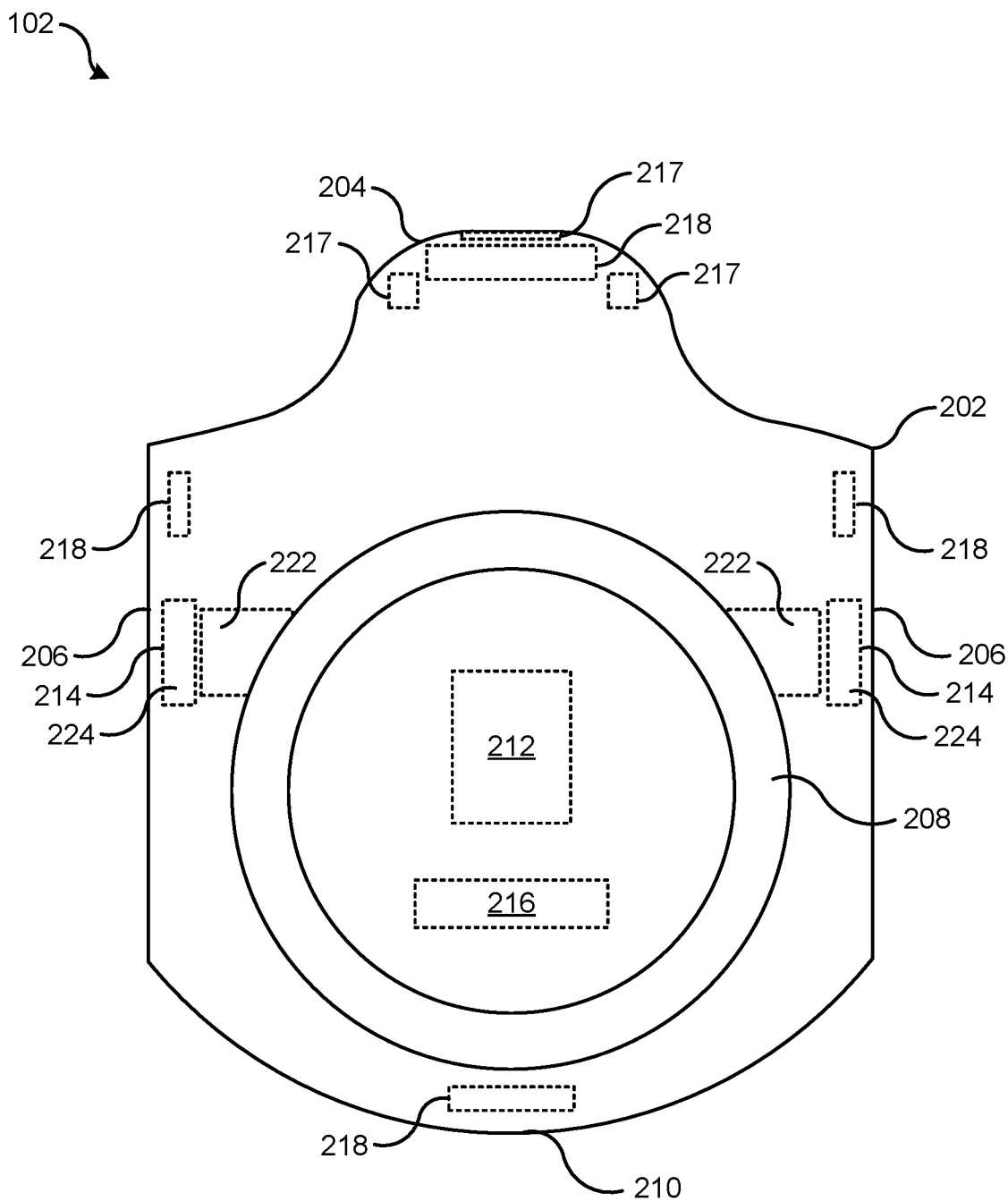
FIG. 3 illustrates a top view of the drive unit of FIG. 2, according to embodiments.

In various embodiments, (e.g., as shown in FIGS. 2 and 3) the mobile drive units 102 can include one or more sensors 218. The sensors 218 can detect various objects in the workspace 112. For example, the sensors 218 can detect inventory items, inventory holders 104, other mobile drive units 102, inventory stations 106, one or more calibration fixtures 117 associated with the calibration region 108, and/or individuals in the workspace 112. The sensors 218 can be or include a camera, Lidar, radar, a proximity sensor, an impact sensor, a magnetic sensor, an electrical sensor, a color sensor, a cliff sensor, an electromagnetic sensor (e.g., to detect electromagnetic field intensity and/or orientation), a brightness sensor, a spectrometer, a photometer, and/or any suitable sensors for detecting objects in the workspace 112.

In various embodiments, one or more fiducials 114 (e.g., fixed navigation anchors) can be positioned in the workspace 112 (e.g., on the floor, ceiling, and/or wall of the workspace 112). The fiducials 114 can be used for navigation (e.g., provide navigational references and/or directions to the mobile drive units 102). The fiducials 114 can additionally or alternatively be used to demarcate different regions (e.g., different functional regions within the workspace 112). In further embodiments, a calibration fiducial 115 can be positioned in the calibration region 108. The calibration fiducial 115 can be used to identify a calibration position (e.g., a position that is a known distance away from the calibration fixture 117 and/or a known angular position with respect to the calibration fixture 117). For example, the mobile drive units 102 can navigate to the calibration fiducial 115 in the calibration region and detect calibration data associated with a calibration fixture 117. The fiducials 114 and/or the calibration fiducial 115 can be or include stickers, markers, markings, and/or physical objects (e.g., an alignment pin).

In various embodiments, the mobile drive units 102 can operate without human intervention in a structured area (e.g., using the fiducials 114 and/or the calibration fiducial 115). For examples, the fiducials 114 and/or the calibration fiducial 115 can be detected by sensors on the mobile drive units 102 to aid in the navigation of the mobile drive units 102 around the workspace 112.

In further embodiments, the mobile drive units 102 can additionally or alternatively operate without human intervention in an unstructured area (or field) that does not contain fiducials. For example, the mobile drive units 102 can be equipped with autonomous navigation functions and/or sensors 218 that enable the mobile drive unit 102 to maneuver within the workspace 170 without the use of fiducials.

The workspace 112 can represent an area associated with the inventory system 100. For example, the workspace 112 can be a place in which the mobile drive units 102 can move and/or the inventory holders 104 can be stored. In various embodiments, the workspace 112 can represent some or all of the floor of a warehouse environment in which the inventory system 100 operates. Although FIG. 1 shows, for the purposes of illustration, an embodiment of the inventory system 100 in which the workspace 112 includes a fixed, predetermined, and finite physical space, particular embodiments of the inventory system 100 may include mobile drive units 102 and/or inventory holders 104 that are configured to operate within a workspace 112 that is of variable dimensions and/or of an arbitrary geometry. Similarly, while FIG. 1 illustrates a particular embodiment of the inventory system 100 in which the workspace 112 is entirely enclosed in a warehouse environment, alternative embodiments can utilize the workspace 112 in which some or all of the workspace 112 is located, for example, outdoors, within a vehicle (such as a cargo ship), and/or otherwise unconstrained by any fixed structure.

The management module 110 can assign tasks to appropriate components of the inventory system 100 and/or can coordinate operation of the various components of the inventory system 100 in completing the tasks. These tasks can relate to the movement and processing of inventory items and/or to the management and maintenance of the components of the inventory system 100. For example, the management module 110 can assign portions of the workspace 112 for "parking" the mobile drive units 102, for example, for recharging and/or replacing batteries of the mobile drive units 102. The management module 110 can additionally or alternatively assign portion of the workspace 112 for the storage of empty inventory holders 104 and/or any other operations associated with the functionality supported by the inventory system 100 and its various components. In various embodiment described herein, the management module 110 can instruct the mobile drive units 102 to move to the calibration region 108 (e.g., for calibration of the mobile drive units 102). For example, the management module 110 can instruct the mobile drive units 102 to move, in sequence, to the calibration position (e.g., calibration fiducial 115) in the calibration region 108. In the calibration position, each of the mobile drive units 102 can detect calibration data associated with and/or relative to a calibration fixture 117. The mobile drive units 102 can be instructed to move to the calibration region 108 sequentially (e.g., based on time, distance traveled, tasks complete, condition, sensor reading, or the like). In some embodiments, the mobile drive units 102 can be positioned in the calibration region 108 (e.g., moved to the calibration region) for calibration by any suitable technique which may include operation of the mobile drive unit 102 and/or movement of the mobile drive unit 102 when the mobile drive unit 102 is not operating.

The calibration data can include a position of the calibration fixture 117 relative to the mobile drive units 102 positioned with respect to the calibration fiducial 115. Additionally or alternatively, the calibration data can include the orientation of the calibration fixture 117 relative to the mobile drive units 102 positioned with respect to the calibration fiducial 115. However, the calibration data may include any suitable data associated with the calibration fixture 117 and/or the sensors 218. The calibration data can be used for calibration of the sensors 218. For example, the calibration data can indicate that there is a difference in the expected position of the calibration fixture 117 and the detected position of the calibration fixture 117. Such a difference may be indicative of any of several possibilities individually and/or collectively. As one example, the calibration data can indicate there is an error associated with a positioning of the sensors 218 relative to the chassis of the mobile drive unit 102. Additionally or alternatively, calibration data may indicate an error associated with the position and/or orientation of the calibration position (e.g., an error with the calibration fiducial 115 relative to which the mobile drive units 102 is positioned when performing calibration operations). Additionally or alternatively, calibration data may indicate an error associated with the position, orientation, and/or other characteristic of the calibration fixture 117. However, the calibration data from an individual mobile drive unit 102 may lack sufficient information to indicate what portion of the error is attributable to the calibration fixture 117, what portion of the error is attributable to the calibration fiducial 115, and/or what portion of the error is attributable to the sensor alignment. Even so, the calibration data may nevertheless be useful for improving calibration of the individual mobile drive unit 102 and/or other mobile drive units 102 in the fleet, such as explained in additional detail below.

The calibration data can be used for calibration of the sensors 218 of individual mobile drive units 102. For example, each mobile drive unit 102 (or the management module 110 on behalf of an individual mobile drive unit 102) can determine a correction factor (e.g., a local correction factor) and calibrate the associated sensors 218 of that mobile drive unit 102 based on the local correction factor. The calibration of the sensors 218 based on the local correction factor can correct for errors caused by misalignment of the sensors relative to the chassis of the mobile drive unit 102. For example, the mobile drive units 102 can calibrate the sensors 218 based on the local calibration. The calibration of the sensors 218 based on the correction factor may occur without—or independent of—correcting for error associated with the position and/or orientation of the calibration fixture 117 (e.g., errors caused by the calibration target and/or calibration position being in an actual position and/or orientation that is different than an expected position and/or orientation).

In various embodiments, the correction factors and/or underlying calibration data for the individual mobile drive units 102 (e.g., from across the fleet of mobile drive units 102) can be received and collected by the management module 110 or otherwise processed for use across the fleet. The correction factors and/or calibration data can be used to implement system wide calibration of the mobile drive units 102 (e.g., calibration of the sensors on the mobile drive units 102). For example, aggregated individual correction factors and/or accumulated calibration data can be used to determine a fleet wide correction factor (e.g., a second correction factor). The fleet wide correction factor can be deployed to the fleet of mobile drive units 102 to update calibration of the sensors 218. The fleet wide correction factor can correct for errors associated with the position and/or orientation of the calibration fixture 117 (e.g., errors caused by the calibration target and/or calibration position being in an actual position and/or orientation that is different than an expected position and/or orientation).

The management module 110 may select components of the inventory system 100 to perform the tasks and communicate appropriate commands and/or data to the selected components to facilitate completion of the various operations. For example, the management module 110 can generate and transmit task assignments 116 to the selected components to trigger completion of the relevant tasks. Each task assignment 116 can include one or more tasks to be completed by a particular component. For example, the tasks can be or include the retrieval, storage, replenishment, and/or the counting of inventory items and/or the management of the mobile drive units 102 (e.g., the calibration of the mobile drive units 102). Depending on the component and task to be completed, a particular task assignment 116 can identify locations, components, and/or actions associated with the corresponding task and/or any other appropriate information to be used by the relevant component in completing the assigned task.

In various embodiments, the management module 110 can communicate task assignments 116 to a subset of the mobile drive units 102. For example, the management module 110 can instruct a subset of the mobile drive units 102 to act in sequence to move to the calibration region 108 and detect calibration data (e.g., for system-wide calibration of the mobile drive units 102).

Although shown in FIG. 1 as a single, discrete component, the management module 110 can represent multiple components and/or can represent or include portions of the mobile drive units 102 and/or other elements of the inventory system 100. Accordingly, any or all of the functionality of the management module 110 that is described herein may, in particular embodiments, represent functionality of a mobile drive unit 102 (e.g., a controller within the mobile drive unit 102).

In further embodiments, the management module 110 can select a mobile drive unit 102 to assign the relevant task based on the location or state of the selected mobile drive unit 102, an indication that the selected drive unit 102 has completed a previously-assigned task, a predetermined schedule, and/or any other suitable consideration. These destinations can be associated with an inventory request that the management module 110 is executing and/or a management objective that the management module 110 is attempting to fulfill. For example, the task assignment can define the location of an inventory holder 104 to be retrieved, an inventory station 106 to be visited, a storage location where the mobile drive unit 102 should park until receiving another task, the location of the calibration region 108, or a location associated with any other task appropriate based on the configuration, characteristics, and/or state of the inventory system 100, as a whole, or individual components of the inventory system 100.

As part of completing various task assignments 116, the mobile drive units 102 can move the inventory holders 104 between locations within the workspace 112. For example, the mobile drive units 102 can dock with and transport the inventory holders 104 within the workspace 112.

The management module 110 can communicate with various components of the inventory system 100. For example, the management module 110 can communicate to receive calibration data from the mobile drive units 102, to receive information identifying selected inventory holders 104, to transmit the locations of the mobile drive units 102, to transmit image data for images of fiducials 114 and/or the calibration fiducial 115 captured by the mobile drive units 102, and/or to exchange any other suitable information to be used by the management module 110 and/or the mobile drive units 102 during operation. The management module 110 can communicate with the components of the inventory system 100 (e.g., the mobile drive units 102) wirelessly, using wired connections, and/or in any other appropriate manner. Additionally or alternatively, the mobile drive units 102 can communicate with components of the inventory system 100 and/or with one another wirelessly, using wired connections, and/or in any other appropriate manner.

In various embodiments, the management module 110 and/or the mobile drive units 102 can communicate using IEEE 802.11, Bluetooth, or Infrared Data Association (IrDA) standards, or any other appropriate wireless communication protocol. Additionally or alternatively, the inventory system 100 can include tracks or other guidance elements upon which the mobile drive units 102 can be wired to facilitate communication between the mobile drive units 102, between the management module 110 and the mobile drive units 102, and/or between the components of the inventory system 100. In general, the mobile drive units 102 can be powered, propelled, and controlled in any manner appropriate based on the configuration and characteristics of the inventory system 100.

The inventory stations 106 can represent locations designated for the completion of particular tasks involving inventory items. For example, the tasks can include the removal of inventory items from the inventory holders 104, the introduction of inventory items into the inventory holders 104, the counting of inventory items in the inventory holders 104, the decomposition of inventory items (e.g., separating from pallet-sized or case-sized groups into individual inventory items), the consolidation of inventory items between the inventory holders 104, and/or the processing or handling of inventory items in any other suitable manner.

In some embodiments, one or more inventory stations 106 can represent a location at which the inventory system 100 is externally accessible by human operator(s) and/or robotic system(s) external to the inventory system 100. In some embodiments, the workspace 112 can be externally bounded by walls and/or a fence to prevent or limit access to the workspace 112 by human operator(s) (e.g., a structured environment), and each of the inventory stations 106 is arranged at a respective opening in the walls or fence. In some embodiments, the workspace 112 is not externally bounded (e.g., an unstructured environment). In further embodiments, the inventory system 100 can allow both mobile drive units 102 and human operator(s) to navigate through the workspace 112 and interact with various components of the inventory system 100.

In various embodiments, the sensors 218 of the mobile drive units 102 can be calibrated. For example, the sensors 218 of the mobile drive units 102 can be calibrated sequentially (e.g., one at a time). The sensors 218 of the mobile drive units 102 can be calibrated before deployment in the workspace 112, after deployment in the workspace 112, and/or regularly (e.g., at predetermined time intervals). In some embodiments, the sensors 218 can experience a loss in calibration. For example, the loss in calibration can be due to the mobile drive units 102 experiencing various types of phenomena, including, for example, shock, vibrations, temperature changes, humidity, etc. The resulting loss in calibration, in turn, can impact the ability of the mobile drive units 102 to accurately and reliably move around the workspace 112 and/or to identify various objects within the workspace 112.

A calibration region 108 can be or include a designated area and/or a designated location (e.g., a calibration position) where the mobile drive units 102 can autonomously travel to for calibration of the sensors 218. For example, the calibration region 108 can include a calibration position that is a known distance and/or a known orientation relative to a calibration fixture 117 associated with the calibration region 108. As shown in FIG. 1, the calibration region 108 can be located within the workspace 112, which may be a structured field or an unstructured field. However, the calibration region 108 may be located outside of the workspace 112.

The mobile drive units 102 can detect data associated with the calibration fixture 117 associated with the calibration region 108 (e.g., a position of the calibration fixture 117 relative to the mobile drive unit 102). The measured data can be compared with expected data for calibration of the sensors (e.g., the measured data can be compared with the expected data to determine the error caused by, for example, misalignment of the sensors 218 with the chassis of the mobile drive unit 102). For example, a measured position of the calibration fixture 117 can be compared with an expected position of calibration fixture 117. The expected data can be based on knowing the position and/or orientation of the mobile drive unit 102 at the calibration position and the position and/or orientation of the calibration fixture 117. Based on the difference between the measured data and the expected data (e.g., the error of the sensor 218), the sensors 218 can be calibrated. For example, the sensor software can be updated to correct for the error from the misalignment of the sensor 218 with the chassis of the mobile drive unit 102. The measured data and the expected data can be or include the position, orientation, texture, electromagnetic field intensity, electromagnetic field orientation, texture, color, and/or any suitable data associated with the calibration fixture 117.

In various embodiments, the measured data, the difference between the measured data and the expected data (e.g., the error), and/or the correction factors can be sent to the management module 110. The management module 110 can collect the correction factors and/or calibration data for the fleet of mobile drive units 102 and use the correction factors and/or calibration data to determine a fleet wide correction factor for the fleet of mobile drive units 102. For example, the fleet wide correction factor can correct for any calibration errors caused by the calibration fixture 117 associated with the calibration region 108. For example, the fleet wide correction factor can correct for calibration errors caused by the actual calibration position being different from the expected calibration position (e.g., the calibration fiducial 115 being at a position different from the expected position) and/or from the actual placement of the calibration fixture 117 being different from the expected placement of the calibration fixture 117). The fleet wide correction factor can be sent to the fleet of mobile drive units 102 (e.g., sent each of the mobile drive units 102). The mobile drive units 102 can use the fleet wide correction factor to update (e.g., further update) the calibration of the sensors 218. For example, the fleet wide correction factor can update the calibration of the sensors 218 to correct for errors associated with the calibration fixture 117. The fleet wide correction factor may be applied in addition to a local correction factor for an individual mobile drive unit 102.

In various embodiments, the mobile drive units 102 can be instructed (e.g., by the management module 110) to perform calibration tests based on occurrence of a predetermined condition. The predetermined condition, for example, can include, a time interval (e.g., a predefined amount of time has elapsed since a prior calibration test or a prior recalibration of the sensors 218), an instruction, a predefined event (e.g., a collision with an object), etc. The calibration of the sensors 218 can additionally or alternatively be conducted once per shift.

Turning to FIGS. 2 and 3, an example mobile drive unit 102 is shown. FIG. 2 is a perspective view of the example mobile drive unit 102 and FIG. 3 is a top view of the mobile drive unit 102.

The mobile drive unit 102 can include a body 202 dimensioned to house various components and/or systems of the mobile drive unit 102. For example, the body 202 can form a protective enclosure for the components and/or systems. The body 202 can include one or more housing components of any suitable materials. In various embodiments, the body 202 can include a forward panel 204, one or more side panels 206, a coupling system 208, and/or a rear panel 210. The body 202 can also house a controller 212, a drive system 214, a power storage device 216 (e.g., a battery), one or more indicator lights 217, and/or one or more sensors 218. However, the body 202 can include and/or house any suitable mobile drive unit components.

The power storage device 216 can provide power to the controller 212, the drive system 214, the indicator lights 217, and/or the sensors 218. For example, the power storage device 216 can include one or more battery modules that can provide power to the components of the mobile drive unit 102. In various embodiments, the power storage device 216 can include rechargeable battery packs. For example, the mobile drive units 102 can engage with a docking system to recharge the battery packs. Additionally or alternatively the power storage device 216 can be removed and replaced with a fully charged power storage device 216.

The coupling system 208 can engage with the inventory holder 104. For example, the coupling system 208 can engage with the inventory holder 104 to allow the mobile drive unit 102 to move the inventory holder 104 (e.g., around the workspace 112). The coupling system 208 can additionally or alternatively allow the drive unit 200 to lift the inventory holder 104, propel the inventory holder 104, rotate the inventory holder 104, and/or move the inventory holder 104 in any other appropriate manner.

The controller 212 can include one or more computer processors (also referred to as processors) and a memory. The one or more computer processors may be implemented in any suitable form, such as a general purpose microprocessor, an application-specific integrated circuit (ASIC), and so forth. The memory may include a variety of computer-readable media selected for their size, relative performance, or other capabilities: volatile and/or non-volatile media, removable and/or non-removable media, etc. The controller 212 can be configured to implement one or more techniques described herein for performing an automated calibration test and/or a recalibration of the sensors 218 of the mobile drive units 102.

The one or more sensors 218 can be or include sensors that can aid in navigation around the environment (e.g., around the workspace 112). The sensors 218 can be or include inertial sensors, navigational sensors, and so forth. In various embodiments, for example embodiments where the mobile drive unit 102 is operating in an unstructured field, the mobile drive unit 102 can be equipped with sensors 218 that can be used for navigation through the unstructured field. In further embodiments, the mobile drive unit 102 can include sensors with different positions and/or orientations. For example, a first sensor 218 can detect the calibration fiducial 115 and a second sensor 218 can detect the calibration fixture 117 associated with calibration region 108.

The forward panel 204 can be positioned such that when the mobile drive unit 102 is moving in a forward direction the forward panel 204 is oriented forward (e.g., oriented to be on the leading side of the mobile drive unit 102 when the mobile drive unit 102 is moving in the forward movement direction). The forward panel 204 can include one or more sensors 218 and/or one or more indicator lights 217. The sensors 218 can be part of an obstacle detection system that can detect obstacles (e.g., objects, individuals, and/or items in the workspace 112), physical barriers, calibration fixtures 117, fiducials 114, the calibration fiducial 115, and/or other mobile drive units 102 within the environment (e.g., workspace 112). The sensors 218 can additionally or alternatively be or include visual sensors (e.g., cameras), ranging sensors (e.g., radar, lidar), proximity sensors, an impact sensor, a color sensor, a magnetic sensor, an electrical sensor, a cliff sensor, a brightness sensor, a spectrometer, a photometer, and/or any suitable sensors 218 for detecting obstacles in the workspace 112.

The side panel 206 can face a direction adjacent the forward direction of motion of the mobile drive unit 102. The side panel 206 can include one or more sensors 218. For example, the side panel 206 can include a camera and/or an impact sensor. In various embodiments, the sensor 218 can be or include a downward-facing camera configured to detect fiducials 114 and/or the calibration fiducial 115 (or fiducial markers) on the floor of the environment (e.g., workspace 112).

The rear panel 210 can face a direction opposite the direction of motion of the mobile drive unit 102. The rear panel 210 can include one or more sensors 218. For example, the rear panel 210 can include a camera and/or an impact sensor.

The controller 212 can receive sensor signals from the sensors 218 and perform processing on the sensor signals. For example, the computer processor(s) of the controller 212 can perform image processing on the sensor signals (e.g., images) received from the sensors 218 to detect obstacles, physical barriers, etc. The controller 212 can additionally or alternatively calibrate the sensors 218. For example, the controller 212 can compare detected calibration data with expected calibration data to determine the error for the sensor 218 (e.g., the error from the misalignment of the sensor 218 with the chassis of the mobile drive unit 102). The controller 212 can update the calibration of the sensors 218 based on the error (e.g., to correct for the error).

In further embodiments, the computer processor(s) of the controller 212 can perform navigation control based on the sensor signals (e.g., images) received from the sensors 218. As noted above, the workspace 112 associated with the inventory system 100 can include a number of fiducials 114 distributed to cover all or a portion of the workspace 112 and/or a calibration fiducial 115 positioned in the calibration region 108. In such embodiments, the sensors 218 can detect the fiducials within the field-of-view of the sensors 218 (e.g., on the floor of the workspace 112). The controller 212 can determine location information that includes a position and orientation of the mobile drive unit 102, via processing an image captured by the sensors 218 encompassing one or more of the fiducials 114 and/or the calibration fiducial 115. As a result, the controller 212 can maintain an accurate indication of the location and orientation of the mobile drive unit 102 to aid in navigation when moving the mobile drive unit 102 within the workspace 112. In some embodiments, the controller 212 can transmit the sensor signals from the sensors 218 to another computing system (e.g., management module 110), for example, to determine location information of the mobile drive unit 102. In this embodiment, the other computing system may transmit navigational commands to the mobile drive unit 102, based on the location information.

The controller 212 can generate one or more control signals for the drive system 214 to actuate the mobile drive unit 102 over the floor of the environment. The one or more control signals for the drive system 214 can be based on at least one of the sensor signals from the sensors 218. In some embodiments, the controller 212 can further receive sensor signals from a navigational sensor (which may be implemented in the mobile drive unit 102 or in an external computing device) and the one or more control signals for the drive system 214 can be further based on the sensor signals from the navigational sensor.

The drive system 214 can include a powertrain (e.g., electric motor(s) 222 and drivetrain components) (not shown) and wheels 224. In some embodiments, the mobile drive unit 102 can use differential steering to turn the mobile drive unit 102 without separately steering the wheels 224. For example, the mobile drive unit 102 may be able to perform neutral turns by rotating, within a pair of axially-aligned wheels, one wheel in a forward direction and the other wheel in a reverse direction. Further, in some embodiments, the mobile drive unit 102 may include one or more stabilizer wheels that are not driven by the drive system 214.

In some embodiments, the mobile drive unit 102 can include one or more indicator lights 217 (e.g., within the forward panel 204). The controller 212 can selectively illuminate the indicator lights 217 of the forward panel 204, as well as any other indicator lights 217 of the mobile drive unit 102. The indicator lights 217 can convey any suitable information to human operators collocated within the environment. For example, the controller 212 can operate the indicator lights 217 to indicate that the mobile drive unit 102 is moving, a direction that the mobile drive unit 102 is moving, how fast the mobile drive unit 102 is moving, whether the mobile drive unit 102 is engaged with an inventory holder, whether the mobile drive unit 102 detects an obstacle, a physical barrier, the calibration fiducial 115, and/or a fiducial 114, and so forth. The controller 212 can additionally or alternatively illuminate the indicator lights 217 in any manner suitable to convey the different information. For example, the controller 212 can control the colors displayed by the indicator lights 217, illumination patterns, and so forth.

In various embodiments, the controller 212 can implement or more techniques for performing an automated calibration test and/or automated recalibration of the sensors 218. For example, the controller 212 can generate control signals to transition (e.g., move) the mobile drive unit 102 to the calibration region 108 within the environment (e.g., workspace 112). The controller 212 can perform the calibration test and/or recalibration of the sensors 218 at the calibration region 108. In some embodiments, for example embodiments where the environment is a structured environment, the controller 212 can navigate to the calibration region 108 using the fiducials 114 placed on the floor of the environment. Once at the calibration region 108, the controller 212 can use the calibration fiducial 115 within the calibration region 108 to align the mobile drive unit 102 with respect to calibration fixture 117 associated with the calibration region 108. For example, the controller 212 can adjust at least one of a position or orientation of the drive unit relative to a position or orientation of the calibration fiducial 115, in order to align the drive unit with respect to the calibration fixture 117 associated with the calibration region 108.

The controller 212 can perform the calibration test using the sensors 218 and the calibration fixture 117 associated with the calibration region 108. For example, the controller 212 can determine the error of the sensors 218 by comparing detected calibration data with expected calibration data. The error can be caused by a misalignment of the sensors 218 with the chassis of the mobile drive units 102. The controller 212 can correct for the error (e.g., by implementing a software adjustment that adjusts for the alignment of the sensor 218 relative to the body 202 of the mobile drive unit 102).

The mobile drive unit 102 can travel to the calibration region 108 based on detecting a predetermined condition. The predetermined condition, for example, can include a periodic time interval (e.g., X hours since last calibration, once per day, twice per week, etc.), an instruction (e.g., from management module 110), an event (e.g., collision), etc.

Figure 4:
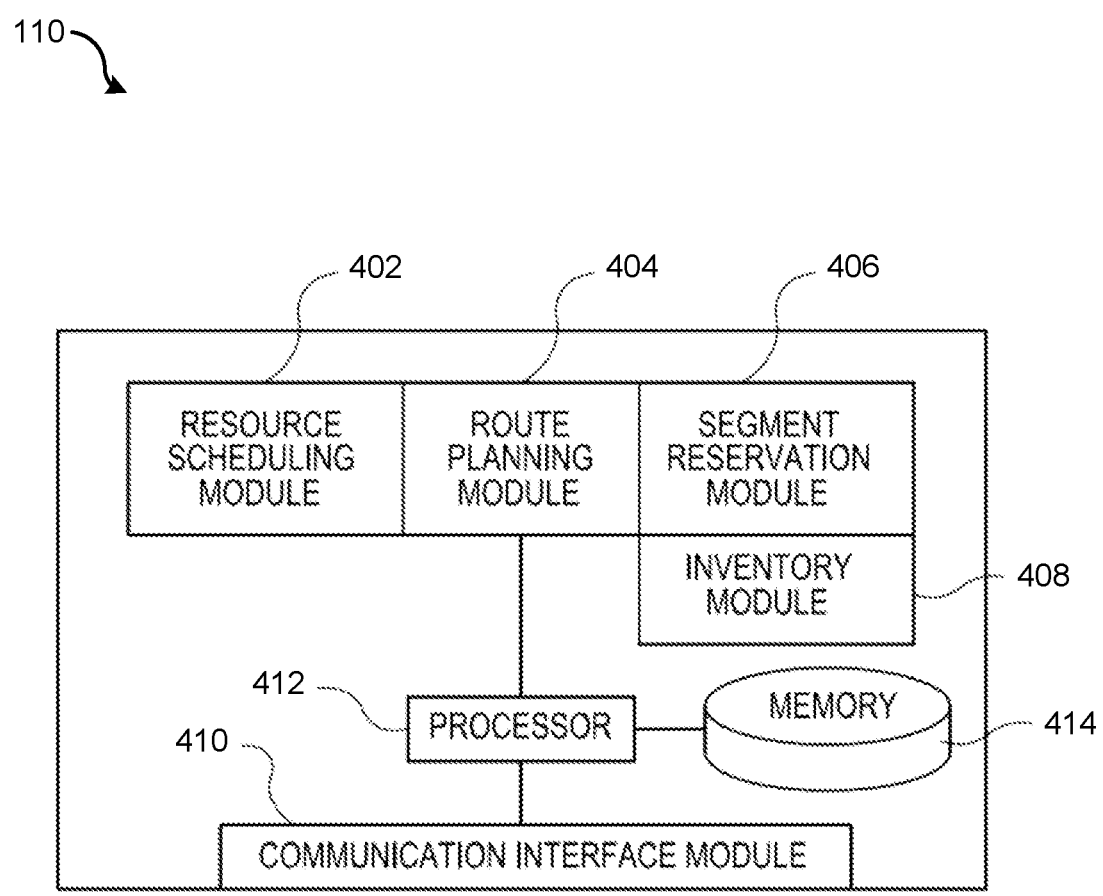
FIG. 4 illustrates an example management module for use with particular embodiments of the inventory system of FIG. 1, according to embodiments.

Turning to FIG. 4, a particular embodiment of management module 110 is shown in greater detail that may be utilized in particular embodiments of the system or architecture shown in FIG. 1. As shown, the example embodiment includes a resource scheduling module 402, a route planning module 404, a segment reservation module 406, an inventory module 408, a communication interface module 410, a processor 412, and a memory 414. The management module 110 can represent a single component, multiple components located at a central location within inventory system 100, or multiple components distributed throughout inventory system 100. For example, the management module 110 may represent components of one or more mobile drive units 102 that are capable of communicating information between the mobile drive units 102 and coordinating the movement of mobile drive units 102 within workspace 112. In general, management module 110 may include any appropriate combination of hardware and/or software suitable to provide the described functionality.

The processor 412 is operable to execute instructions associated with the functionality provided by management module 110. The processor 412 can comprise one or more general purpose computers, dedicated microprocessors, or other processing devices capable of communicating electronic information. Examples of the processor 412 include one or more application-specific integrated circuits (ASICs), field programmable gate arrays (FPGAs), digital signal processors (DSPs) and any other suitable specific or general purpose processors.

In various embodiments, the processor 412 can be used to determine a fleet wide correction factor for the fleet of mobile drive units 102. For example, the correction factor can be used to correct for an error caused by, for example, the calibration fixture 117 associated with the calibration region 108 and/or the calibration fiducial 115. The processor 412 can determine the actual distribution of the errors received from the mobile drive units 102. The distribution of the errors can be compared with an expected distribution. The difference between the actual distribution and the expected distribution can be used to determine the fleet wide correction factor. The fleet wide correction factor can be disseminated to the fleet of mobile drive units 102 (e.g., via the communication interface module 410.

The memory 414 can store processor instructions, inventory requests, reservation information, state information for the various components of inventory system 100 and/or any other appropriate values, parameters, or information utilized by management module 110 during operation. The memory 414 can represent any collection and arrangement of volatile or nonvolatile, local or remote devices suitable for storing data. Examples of the memory 414 include, but are not limited to, random access memory (RAM) devices, read only memory (ROM) devices, magnetic storage devices, optical storage devices or any other suitable data storage devices.

The resource scheduling module 402 can processes received inventory requests and generates one or more assigned tasks to be completed by the components of inventory system 100. The resource scheduling module 402 can additionally or alternatively include one or more appropriate components for completing the assigned tasks and, using communication interface module 410, communicate the assigned tasks to the relevant components. Additionally, the resource scheduling module 402 can also be responsible for generating assigned tasks associated with various management operations, such as prompting the mobile drive units 102 to move to the calibration region 108 for calibration of the sensors 218, to recharge the power storage device 216 and/or have power storage device 216 replaced, to instruct inactive mobile drive units 102 to park in a location outside the anticipated traffic flow or a location near the anticipated site of future tasks, and/or to direct the mobile drive units 102 selected for repair or maintenance to move towards a designated maintenance station.

The route planning module 404 receives route requests from mobile drive units 102. These route requests identify one or more destinations associated with a task the requesting mobile drive unit 102 is executing. In response to receiving a route request, the route planning module 404 can generate a path to one or more destinations identified in the route request. The route planning module 404 may implement any appropriate algorithms utilizing any appropriate parameters, factors, and/or considerations to determine the appropriate path. After generating an appropriate path, the route planning module 404 can transmit a route response identifying the generated path to the requesting mobile drive unit 102 using, using for example, the communication interface module 410.

The segment reservation module 406 can receive reservation requests from mobile drive units 102 attempting to move along paths generated by the route planning module 404. These reservation requests request the use of a particular portion of workspace 112 (referred to herein as a "segment") to allow the requesting mobile drive unit 102 to avoid collisions with other mobile drive units 102 while moving across the reserved segment. In response to received reservation requests, the segment reservation module 406 can transmit a reservation response granting or denying the reservation request to the requesting mobile drive unit 102 using the communication interface module 410.

The inventory module 408 can maintain information about the location and number of items in the inventory system 100. Information can be maintained about the number of items in a particular inventory holder 104 and the maintained information can include the location of those items in the inventory holder. The inventory module 408 can also communicate with the mobile drive units 102, utilizing task assignments 116 to maintain, replenish or move items within the inventory system 100.

The communication interface module 410 can facilitate communication between management module 110 and other components of inventory system 100, including reservation responses, reservation requests, route requests, route responses, and task assignments. These reservation responses, reservation requests, route requests, route responses, and task assignments may represent communication of any form appropriate based on the capabilities of management module 110 and may include any suitable information. Depending on the configuration of management module 110, the communication interface module 410 can be responsible for facilitating either or both of wired and wireless communication between the management module 110 and the various components of inventory system 100. In particular embodiments, the management module 110 can communicate using communication protocols such as 802.11, Bluetooth, or Infrared Data Association (IrDA) standards. Furthermore, the management module 110 can, in particular embodiments, represent a portion of mobile drive unit 102 or other components of inventory system 100. In such embodiments, the communication interface module 410 can facilitate communication between management module 110 and other parts of the same system component.

In general, the resource scheduling module 402, the route planning module 404, the segment reservation module 406, the inventory module 408, and the communication interface module 410 can each represent any appropriate hardware and/or software suitable to provide the described functionality. In addition, as noted above, the management module 110 may, in particular embodiments, represent multiple different discrete components and any or all of the resource scheduling module 402, the route planning module 404, the segment reservation module 406, the inventory module 408, and the communication interface module 410 can represent components physically separate from the remaining elements of management module 110. Moreover, any two or more of the resource scheduling module 402, the route planning module 404, the segment reservation module 406, the inventory module 408, and the communication interface module 410 can share common components. For example, in particular embodiments, the resource scheduling module 402, the route planning module 404, the segment reservation module 406, and the inventory module 408 can represent computer processes executing on the processor 412 and the communication interface module 410 comprises a wireless transmitter, a wireless receiver, and/or a related computer process executing on the processor 412.

Turning to FIGS. 5A and 5B, an example of a mobile drive unit 102 in the calibration region 108 is shown. FIG. 5A shows a side view of the mobile drive unit 102 in the calibration region 108 and FIG. 5B shows a front view of the mobile drive unit 102 in the calibration region 108. In various embodiments, the calibration region 108 can include a calibration fixture 117 that can be used to calibrate the sensors 218. The calibration fixture 117 can include one or more calibration targets 504 positioned on a support 506. The support 506 can include a structure, a wall, an inventory holder 104, an inventory station 106, a mobile drive unit 102, and/or a portion of the workspace 112 (e.g., positioned to be perpendicular or somewhat perpendicular from the floor of the workspace 112). Additionally or alternatively, the support 506 can be or include chains, ropes, strings, wires, and/or any other component suitable for hanging the calibration targets in the workspace 112 (e.g., from a ceiling, rafters, or a wall).

The mobile drive units 102 can enter the calibration region 108 based on instructions from the management module 110. For example, the management module 110 can instruct the mobile drive units 102 to enter the calibration region 108 based on an interval of time (e.g., once per shift), a condition of the mobile drive unit (e.g., after the mobile drive unit 102 has been charged and/or after the mobile drive unit 102 has impacted an object), and/or a condition of the calibration region 108 (e.g., after the calibration fixture 117 has been moved and/or adjusted).

The mobile drive units 102 can enter the calibration region 108 and move to a calibration position. The calibration position can include a calibration fiducial 115 that is positioned at a known location (e.g., a location that is a known distance and/or angle away from the calibration fixture 117). The calibration fiducial 115 can be or include a mark, sticker, a calibration pin, and/or any suitable fixture that can be positioned a fixed distance and/or angle from the calibration fixture 117.

While at the calibration position, the sensors 218 of the mobile drive unit 102 can detect at least a portion of the calibration fixture 117 (e.g., detect data associated with the calibration fixture 117). For example, the sensors 218 can detect one or more calibration targets 504. The calibration targets 504 can have known features that can be used for calibration of the sensors 218. For example, the calibration targets 504 can be a known distance, angle, and/or position relative to the mobile drive unit 102 when the mobile drive unit 102 is positioned at the calibration position. In various embodiments, the known data can include the known reflectiveness, color, texture, electromagnetic field intensity, electromagnetic field orientation, magnetic fields, and/or electric fields of the calibration targets 504 can be used to calibrate the sensors 218.

The data detected by the sensors 218 (e.g., the measured data) can be compared with expected data for calibration of the sensors 218. For example, the measured position of the calibration targets 504 can be compared with the expected position of the calibration targets 504 to calibrate the sensors 218. The difference between the measured data and the known data (e.g., the error) can be used to adjust the sensors 218 (e.g., via a software adjustment). For example, software can be used to make adjustments for misalignments of the sensors 218 with the chassis. The sensors 218 can be adjusted such that the measured data will now match or approximately match the known data. For example, an exact match would bring the error to zero, however, a match with an error of between 0% and 1% or other predetermined range can be acceptable.

The measured data and/or the difference between the measured data and the known data (e.g., the error) can additionally or alternatively be sent to the management module 110. The management module 110 can receive and/or determine error for some, most, or all of the fleet of mobile drive units 102. For example, the management module 110 can determine a correction factor for the mobile drive units 102 to correct for errors associated with the sensors 218 (e.g., the orientation of the sensors 218 relative to the chassis of the mobile drive unit 102). The management module 110 can update the calibration of the sensors 218 based on the correction factor. The management module 110 can collect the correction factors and/or calibration data to determine a fleet wide correction factor. For example, the correction factors and/or calibration data from the mobile drive units 102 can be used to determine if the calibration fixture 117 (or associated structure such as the calibration fiducial 115) has an error. The management module 110 can generate the fleet wide correction factor based on the error caused by the calibration fixture 117 or associated structure. For example, the correction factor can correct for a difference between the expected position of the calibration fixtures 117 and/or calibration targets 504 and the actual position of the calibration fixtures 117 and/or calibration targets 504. The fleet wide correction factor can be sent to some, most, or all of the fleet of mobile drive units 102. The fleet wide correction factor can be used to update the calibration of the sensors 218 in addition to the correction factor determined for each of the individual mobile drive units 102 (e.g., correction factors determined by the management module 110 and/or by each of the mobile drive units 102). Thus, for example, an individual mobile drive unit 102 may be subject to an individual correction (e.g., based on the calibration readings from that individual mobile drive unit 102) and a collective correction (e.g., based on calibration readings synthesized from the fleet of mobile drive units 102).

In embodiments where the sensors 218 include a camera, the calibration fixture 117 can be positioned relative to the calibration position such that when the mobile drive units 102 are positioned at the calibration position, one or more calibration targets 504 are within the field of view 508 of the sensors 218 (e.g., the cameras). For example, as shown in FIG. 5B, the field of view 508a includes one calibration target 504 and the field of view 508b includes multiple calibration targets 504. The position of the calibration target 504 in the field of view 508 can be used to calibrate the sensors 218.

Figure 6A:
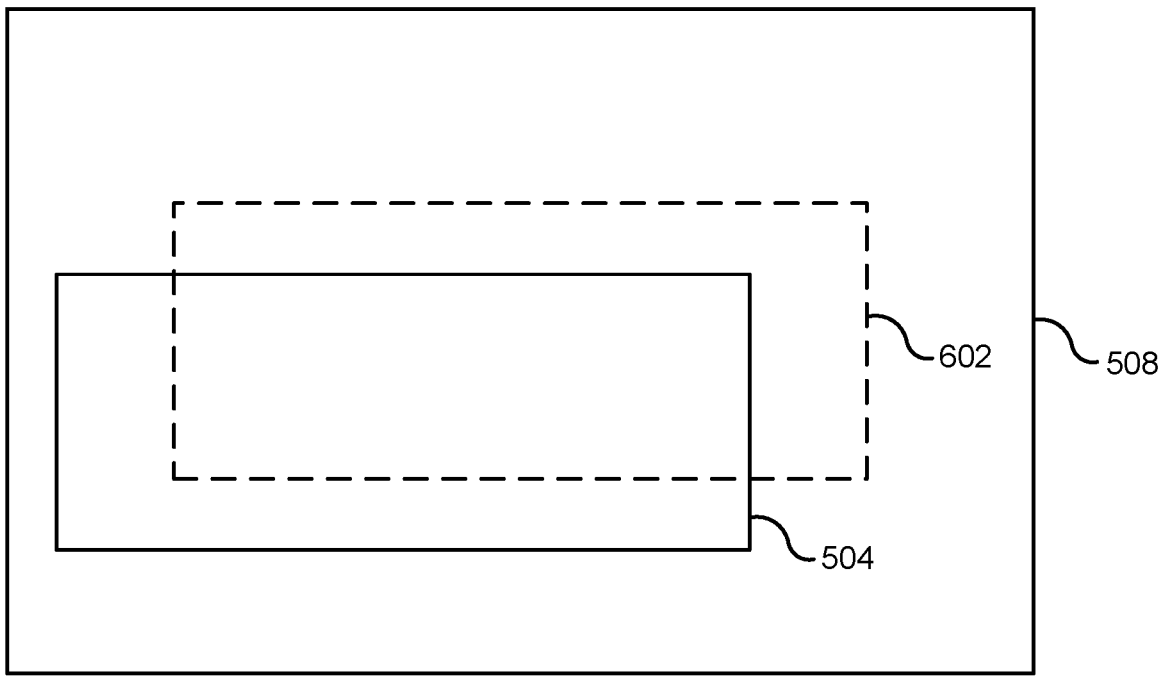
FIGS. 6A and 6B illustrate an example field of view of a sensor of a drive unit of FIG. 1, according to embodiments.
Figure 6B:
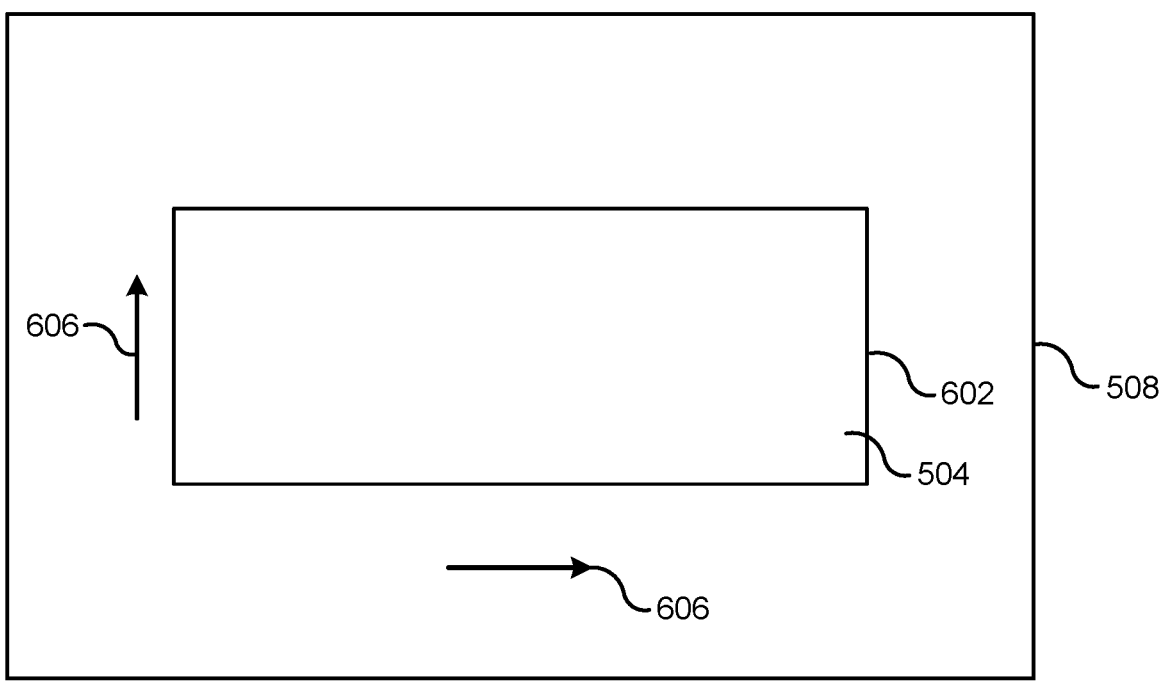

FIGS. 6A and 6B show an example field of view 508 of a camera sensor 218. FIG. 6A shows an uncalibrated field of view 508 and FIG. 6B shows a calibrated field of view 508. As shown in FIG. 6A, the expected position 602 of the calibration target 504 and the actual or measured position of the calibration target 504 can be different (e.g., there can be an error). The error can be caused by misalignment of the sensor 218 with the chassis of the mobile drive unit 102 (e.g., the sensor 218 is oriented differently than expected), the calibration fixture 117 being in a different position than expected, and/or the calibration position being in a different position than expected (e.g., the calibration fiducial 115 being placed differently than expected). The expected position of the calibration target 504 can be determined based on where and/or at what orientation the calibration target 504 is expected to be seen by the camera when the mobile drive unit 102 is positioned at the calibration position (e.g., on the calibration fiducial 115). The measured position of the calibration target 504 can be based on the actual position and/or orientation of the calibration target 504 as seen by the camera when the mobile drive unit 102 is positioned at the calibration position. The differences can cause the measured position to be different from the expected position.

As shown in FIG. 6B, an adjustment (e.g., a software adjustment) can be used to correct for the difference between the measured position of the calibration target 504 and the expected position 602 of the calibration target 504. For example, the software can correct the misalignment of the camera and the chassis of the mobile drive unit 102 and/or the error caused by the calibration fixture 117 (e.g., as shown by arrows 606). The correction can allow for the camera to detect the calibration target 504 at the correct position. For example, the measured position of the calibration target 504 and the expected position of the calibration target 504 will match or almost match.

Figure 7:
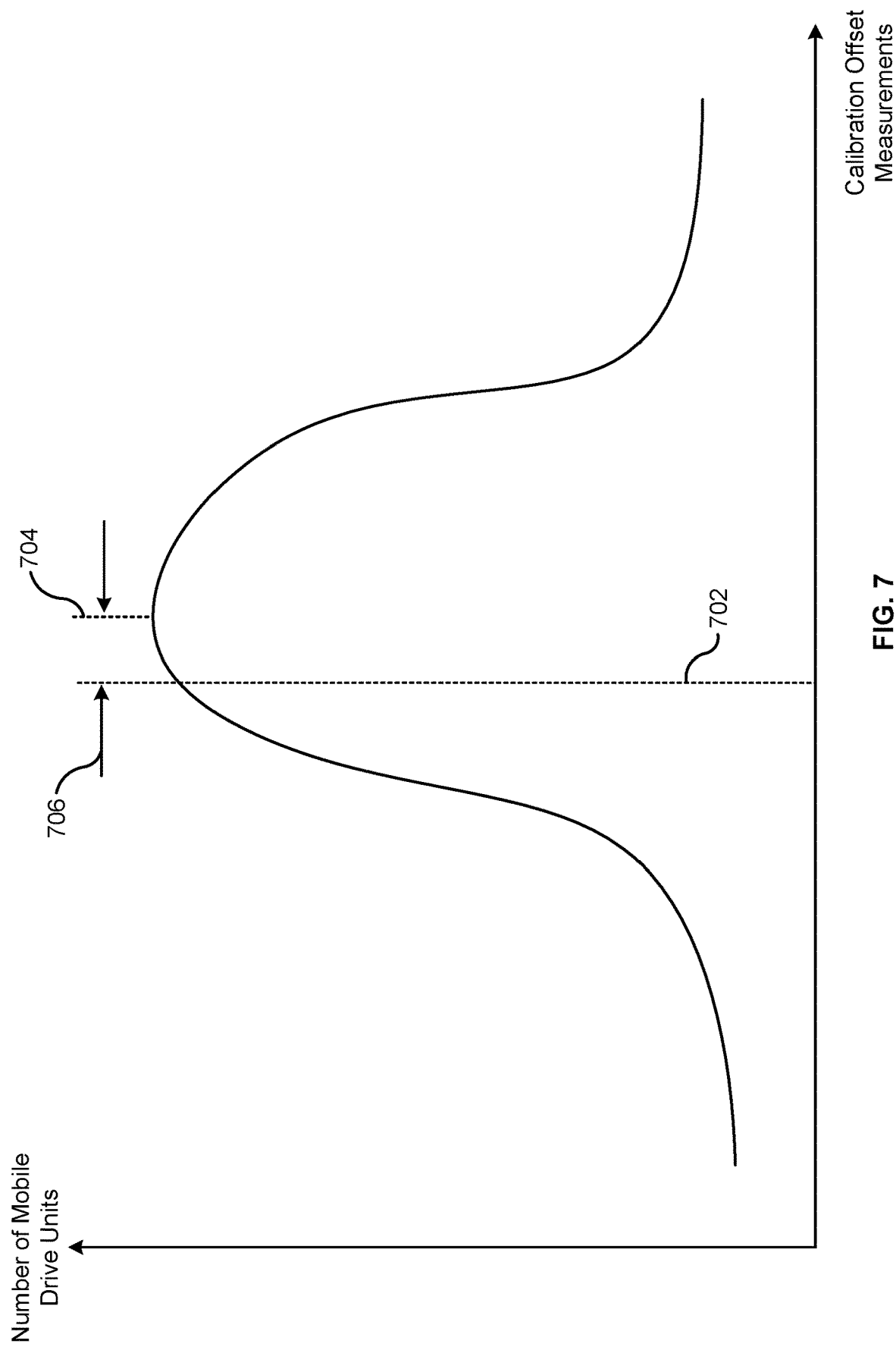
FIG. 7 illustrates an example distribution of readings of the mobile drive units of FIG. 1, according to embodiments.

The errors for some, most, or all of the fleet of mobile drive units 102 can be used to determine a fleet wide correction factor for the fleet of mobile drive units 102. If the calibration fixture 117 and/or the calibration fiducial 115 are in the correct position and/or orientation, the errors are expected to be distributed about a first, expected value 702 (e.g., as indicated by line 702 in FIG. 7). However, if there is an error caused by the calibration fixture 117 and/or the calibration fiducial 115 (e.g., by the calibration fixture 117 and/or the calibration fiducial 115 being in a different position and/or orientation than expected) the errors are expected to be distributed about a second, measured value 704 (e.g., as indicated by line 704 in FIG. 7). The expected value 702 can be a mean offset value for the correction factors and/or measurements received from the mobile drive units 102. In various embodiments, the expected value 702 can be zero. However, the expected value 702 can be a non-zero number. For example, if the sensors 218 are biased to a certain direction and/or orientation relative to the chassis of the mobile drive unit 102, the expected value 702 can be non-zero. The non-zero expected value can be determined by measuring the bias and applying the bias value to the mean offset at zero.

A difference (e.g., as indicated by arrows 706 of FIG. 7) between the first value (e.g., line 702) and the second value (e.g., line 704) can be used to determine a correction factor. The correction factor can be applied to some, most, or all of the fleet of mobile drive units 102 to correct for errors caused by the calibration fixture 117. Correcting for the error from the calibration fixture 117 allows for a less precise calibration fixture 117 to be used for calibration. This can allow for the use of less expensive and/or precise calibration fixtures 117 that can be more easily mass produced and installed in environments.

In various embodiments, the sensors 218 can be biased relative to the chassis of the mobile drive units 102. In such embodiments, the bias can cause the actual distribution to be different from the expected distribution, however, this can be caused by the bias and not by the 117 and/or calibration fiducial 115 being in a different position than expected. The bias can be corrected for by collecting the correction factors and/or measurements obtained for each of the mobile drive units 102 and applying a fleet wide correction factor to correct for the bias.

Figure 8:
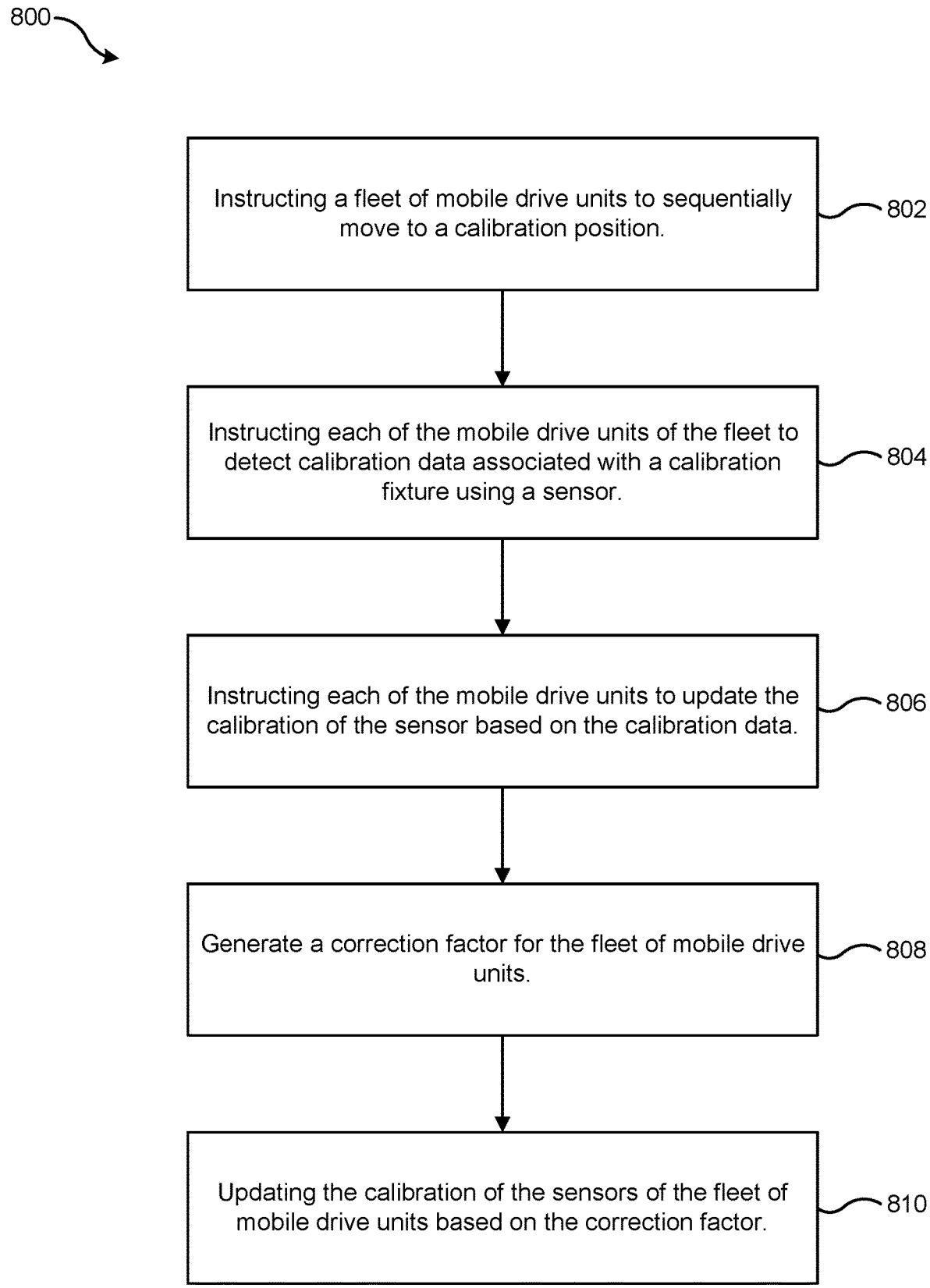
FIG. 8 illustrates a flowchart of a method for calibrating a drive unit of the inventory system of FIG. 1, according to embodiments.

Turning to FIG. 8, a flowchart illustrating a process 800 for calibration of mobile drive units (e.g., mobile drive units 102) is shown. Some or all of the process 800 (or any other process described herein, or variations, and/or combinations thereof) may be performed under the control of one or more computer systems configured with executable instructions and may be implements as code (e.g., executable instructions, one or more computer programs, or one or more applications) executing collectively on one or more processors, by hardware or combinations thereof. For example, the management module 110 can control one or more of the process described herein. The code may be stored on a computer-readable storage medium, for example, in the form of a computer program comprising a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 800 at block 802 can include instructing a fleet of mobile drive units 102 to sequentially move to a calibration position in a calibration region (e.g., calibration region 108). The calibration region 108 and/or the calibration position can be in a warehouse environment. For example, the calibration region 108 and/or the calibration position can be in the warehouse environment in which the mobile drive units 102 operate.

The process 800 at block 804 can include instructing each of the mobile drive units 102 of the fleet to detect calibration data associated with a calibration fixture (e.g., calibration fixture 117) using a sensor (e.g., sensor 218). The sensor 218 can be mounted to the mobile drive unit 102. The calibration fixture 117 can be positioned a known distance and/or a known orientation relative to the calibration position. For example, the position of the calibration fixture 117 can be used to generate expected data. The expected data can be or include the expected position, orientation, texture, color, electromagnetic field intensity, electromagnetic field orientation, magnetic energy, and/or electrical energy of the calibration fixture 117.

The process 800 at block 806 can include instructing the mobile drive units to update the calibration of the sensor 218 based on the calibration data. For example, the expected data can be compared with the calibration data to determine a first correction factor (e.g., to correct for the error from the sensors 218). The calibration data can be used to determine (e.g., calculate) a first correction factor (e.g., a local correction factor). The first correction factor can be used to calibrate the sensors 218. For example, the first correction factor can correct for errors caused by a misalignment of the sensors 218 relative to the chassis of the mobile drive unit 102. Each of the mobile drive units 102 can determine their own correction factors and calibrate the sensors 218 based on the correction factor. The management module 110 may additionally or alternatively be used to determine the correction factors for each mobile drive units 102 and send the correction factor to the mobile drive units 102 for calibration of the sensors 218.

The process 800 at block 808 can include generating a second correction factor (e.g., a fleet wide correction factor) for the fleet of mobile drive units 102. The fleet wide correction factor can be determined by the management module 110. The management module 110 can receive the local correction factors, measurements, and/or data from the mobile drive units 102. The local correction factors, measurements, and/or data can be used to determine a collective measured value (such as a measured offset or other measured value 704). The measured offset or other collective measured value can be compared to a collective expected value (such as the expected offset or other expected value 702). The fleet wide correction factor can be determined based on the comparing of the collective measured value with the collective expected value (such as comparing the measured offset to the expected offset or otherwise comparing the measured value 704 with the expected value 702). In various embodiments, the expected offset can be zero (e.g., where the sensors 218 or unbiased). However, the expected offset can be non-zero (e.g., where the sensors 218 are biased).

The process 800 at block 810 can include updating the calibration of the sensors 218 of the flee of mobile drive units 102 based on the correction factor. The difference between the expected distribution and the actual distribution can be used to generate a correction factor for the fleet of mobile drive units 102. The correction factor can be used to further update the calibration of the sensor 218 (e.g., update the calibration to account for errors from the calibration fixture 117 or associated structures).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling system, comprising:
   a calibration region positioned within a warehouse environment, the calibration region comprising a calibration position marker and a calibration fixture;
   a fleet of mobile drive units, the fleet of mobile drive units having a plurality of mobile drive units each comprising:
      a propulsion system selectively operable to position the mobile drive unit in the calibration region; and
      one or more sensors configured to detect data associated with the calibration fixture; and
   a management module operable to:
      instruct a first mobile drive unit of the plurality of mobile drive units to move to the calibration position marker;
      instruct the first mobile drive unit to detect, using a first sensor, first calibration data associated with the calibration fixture;
      update calibration of the first sensor based on the first calibration data;
      instruct a second mobile drive unit of the plurality of mobile drive units to move to the calibration position marker;
      instruct the second mobile drive unit to detect, using a second sensor, second calibration data associated with the calibration fixture;
      update calibration of the second sensor based on the second calibration data;
      receive the first and second calibration data associated with the calibration fixture; and
      using a collective set of calibration data that includes at least the first and second calibration data, implement a fleet-wide update to the calibration of the one or more sensors of each of the plurality of mobile drive units including the first and second sensors.

2. The inventory handling system of claim 1, wherein the fleet of mobile drive units comprises greater than 30 mobile drive units.

3. The inventory handling system of claim 1, wherein the first calibration data includes a position, an electromagnetic field intensity, an electromagnetic field orientation, a color, or a texture of the calibration fixture.

4. The inventory handling system of claim 1, wherein the calibration position marker comprises a fiducial or an alignment pin.

5. The inventory handling system of claim 1, wherein the first sensor or the second sensor comprises a camera.

6. The inventory handling system of claim 1, wherein the management module is further operable to determine a fleet-wide correction factor based on the collective set of calibration data, and wherein the fleet-wide update to the calibration of the one or more sensors of each of the plurality of mobile drive units is based on the fleet-wide correction factor.

7. The inventory handling system of claim 1, wherein updating the calibration of the first sensor comprises comparing the first calibration data with an expected value.

8. A system comprising:
- a calibration fixture;
- a fleet of mobile drive units, the fleet of mobile drive units having a plurality of mobile drive units, each of the mobile drive units comprising a sensor configured to detect data associated with the calibration fixture; and
- a management module operable to:
  - instruct a subset of the fleet of mobile drive units including at least two of the mobile drive units of the plurality of mobile drive units to detect, using a sensor, calibration data associated with the calibration fixture;
  - instruct each of the subset of the fleet of mobile drive units to update calibration of the sensor of the mobile drive unit based on the calibration data;
  - receive, from the subset of the fleet of mobile drive units, the calibration data associated with the calibration fixture;
  - generate a correction factor for the fleet of mobile drive units based on calibration data; and
  - update calibration of the sensors of the plurality of mobile drive units based on the correction factor.

9. The system of claim 8, wherein, the management module is further operable to, prior to instructing the subset of the fleet of mobile drive units to detect the calibration data, instruct the mobile drive units to sequentially move to a calibration position in a calibration region.

10. The system of claim 8, wherein the calibration fixture comprises a calibration target coupled with a support, the support being independent from the plurality of mobile drive units.

11. The system of claim 8, wherein the sensor comprises a camera, lidar, radar, a proximity sensor, an impact sensor, a color sensor, a magnetic sensor, an electrical sensor, a brightness sensor, a spectrometer, a photometer, or a cliff sensor.

12. The system of claim 8, wherein at least one of the mobile drive units comprises a coupling system configured to engage with an inventory holder.

13. The system of claim 8, wherein the subset of the fleet of mobile drive units includes at least 100 mobile drive units.

14. A method of calibrating a mobile drive unit, the method comprising:
- instructing a fleet of mobile drive units having a plurality of mobile drive units to sequentially move to a calibration position;
- instructing each of the mobile drive units of the fleet of mobile drive units to detect, using at least one sensor while at the calibration position, calibration data associated with a calibration fixture so that the plurality of mobile drive units collectively generate a plurality of calibration data;
- instructing each of the mobile drive units to update calibration of the at least one sensor based on the calibration data detected by the respective at least one sensor;
- receiving the plurality of calibration data associated with the calibration fixture; and
- updating, based on the plurality of calibration data, calibration of the sensors of the fleet of mobile drive units.

15. The method of claim 14, wherein the fleet of mobile drive units are sequentially moved to the calibration position based on predetermined time.

16. The method of claim 14, wherein the calibration data comprises a position, an orientation, an electromagnetic field intensity, an electromagnetic field orientation, a texture, or a color associated with the calibration fixture.

17. The method of claim 14, wherein updating the calibration of the sensors comprises generating a correction factor for the fleet of mobile drive units based on the calibration data.

18. The method of claim 17, wherein generating the correction factor for the fleet of mobile drive units comprises:
- calculating, using a management module, the correction factor for the fleet of mobile drive units; and
- sending the correction factor to the fleet of mobile drive units for updating the calibration of the sensors of the fleet of mobile drive units.

19. The method of claim 14, wherein instructing each of the fleet of mobile drive units to update the calibration of the at least one sensor comprises comparing the calibration data with an expected value.

20. The method of claim 14, further comprising instructing the fleet of mobile drive units to move around a warehouse environment using the sensors to detect objects in the warehouse environment.

* * * * *